April 8, 1941.  C. W. NESSELL  2,238,000
AIR CONDITIONING SYSTEM
Filed Aug. 16, 1937  4 Sheets-Sheet 3

INVENTOR
Clarence W. Nessell
BY
George H. Fisher
ATTORNEY

April 8, 1941.

C. W. NESSELL 2,238,000

AIR CONDITIONING SYSTEM

Filed Aug. 16, 1937

INVENTOR
Clarence W. Nessell
BY
ATTORNEY

Patented Apr. 8, 1941

2,238,000

UNITED STATES PATENT OFFICE 2,238,000

AIR CONDITIONING SYSTEM

Clarence W. Nessell, Dayton, Ohio, assignor to Minneapolis-Honeywell Regulator Company, Minneapolis, Minn., a corporation of Delaware Application August 16, 1937, Serial No. 159,279

24 Claims. (Cl. 236—1.)

This invention relates to an air conditioning system and more particularly to a system for heating and circulating heated air, or circulating unheated air throughout a building as outside conditions require. In such systems, it is customary to provide a warm air furnace, automatically controlled as by a room thermostat for supplying heated air when conditions require, and a fan or blower for circulating air through the heated chamber of the furnace and through the space to be heated.

In such a system, in cold weather, it is desirable to circulate the air through the furnace and the space to be heated at different rates depending on the temperature in the heating chamber. In one system that has been proposed, and which is described in the application of John P. Kriechbaum, Serial No. 678,429, filed June 30, 1933, now Patent No. 2,222,800 dated Nov. 26, 1940, after the temperature in the heating chamber reaches a predetermined temperature as a result of heat being supplied in response to a call from a room thermostat, the fan is started circulating air at a high speed. After the room thermostat is satisfied, and the supply of heat to the furnace is stopped, the speed of the fan is immediately reduced, and after the temperature of the heating chamber is reduced to the point where the fan started up at high speed, the fan stops.

This invention seeks to improve this system which has the following disadvantages. If the temperature at which the fan starts at high speed is relatively high, the fan stops rotating before all the residual heat in the heating chamber is circulated by the fan. In this way, the residual heat is not completely utilized to maintain the temperature of the space substantially at the point where the heat to the furnace was shut off. If the temperature at which the fan stops is set low enough so that all the residual heat which may be advantageously circulated throughout the space is circulated, the fan will start operating at high speed at this low temperature during the heating cycle. The result will be that the fan will be operating at a speed which will carry the air from the furnace at a rate which is faster than that at which heat is supplied to it which will tend to cool the furnace.

My invention is designed as an improvement over this system. When the room thermostat calls for heat and the heating chamber reaches a predetermined temperature, the fan starts running at slow speed, and continues at slow speed until the temperature of the heating chamber reaches a predetermined value, at which time the fan goes on high speed. As soon as the room thermostat is satisfied and the supply of heat to the furnace is discontinued in response thereto, the fan is shifted back to low speed, in order to supply heat at a rate fast enough to maintain the room temperature substantially constant but not fast enough to cause a further rise in temperature. When the temperature of the heated chamber becomes sufficiently cool, the fan is stopped, as otherwise cold air would be circulated through the room. Instead of using a two speed fan, a single speed fan may be used in conjunction with adjustable dampers in the circulating system and a motor to operate the damper in such a way that the above described cycle of operation will take place.

The high to low speed cycle of the fan may be controlled in many ways. One method of doing this is to provide a stack switch in the high speed fan circuit, or in the damper motor circuit, which opens this circuit as soon as the stack temperature starts to fall. This takes place almost immediately after the supply of heat to the heating chamber is cut off. Another method of doing this is to provide a switch in the high speed circuit or damper motor circuit which is controlled by the same means that controls the heat supply to the furnace, which, as soon as the heat supply is cut off, opens the high speed fan circuit, or causes the damper motor to operate to partially close the dampers.

One object of my invention is to provide a warm air heating system which automatically supplies heat to a space as required, at varying rates depending upon the temperature of the heating chamber and of the space to be heated in an improved manner.

Another object of my invention is to provide a warm air heating system in which heat is automatically supplied to a heating chamber when heat is required in the space to be heated, and in which air is circulated through the heating chamber and the space at varying rates depending upon the temperature of the heating chamber and of the space to be heated in an improved manner.

More specifically, it is an object of my invention to provide, in a warm air heating system, means to automatically supply heat to a heating chamber when heat is required in a space to be heated, to circulate air through the heating chamber and space at a low rate until the heating chamber reaches a certain temperature, to circulate the air at a high rate until the space reaches a certain temperature, to decrease the rate of circulation when such temperature is attained, to stop the supply of heat to said chamber at the same time, and to stop the circulation of air after the chamber cools to a certain temperature.

Another object of my invention is to provide, in such a system, means whereby air may be circulated through the space when no heat is being supplied to the chamber, and when the temperature of the space has risen to a predetermined temperature, as may be desirable in the summer time.

Figure 1:
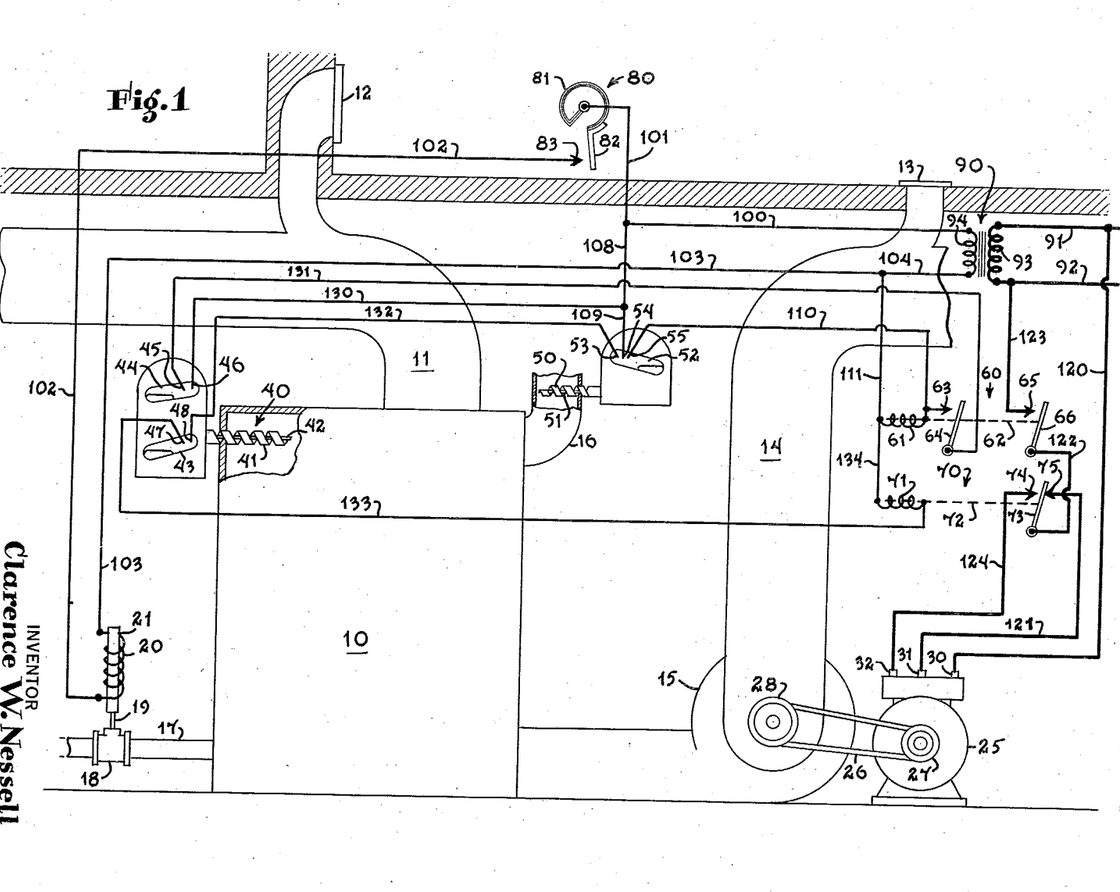
Figure 1 is a view showing one form of my invention as applied to a warm air heating system.

Other objects and advantages will become apparent to those skilled in the art upon examination of the specification, claims, and drawings in which similar parts in the various views are represented by similar reference characters and in which:

DESCRIPTION OF FIGURE 1

In Figure 1 I have illustrated a heating system consisting of a warm air furnace 10 having a warm air duct 11 leading to a warm air register 12, a return air register 13 communicating with a return air duct 14 leading to the inlet of a blower 15, an exhaust stack 16 and a fuel delivery pipe 17.

A valve 18 is provided to control the flow of fuel through the pipe 17 and a valve stem 19 extends upwardly from the valve 18 and is connected to an armature 21 located within an induction coil 20. When coil 20 is energized it exerts an upward pull on armature 21 thereby affecting the opening of valve 18. Any suitable means such as a spring (not shown) may be provided for biasing the valve to closed position.

For driving the fan 15 I have provided a motor 25 connected to the fan by means of a belt 26 extending over pulleys 27 and 28 of the motor and fan respectively. The motor 25 is of the two-speed type and is provided with low speed terminals 30 and 31 and high speed terminals 30 and 32.

Located within the heating chamber of the furnace 10 is a temperature responsive element 40 which consists of a bimetallic member 41 connected at one end to a rod 42. A rise in temperature in the heating chamber will cause the bimetallic member 41 to expand and thereby cause rotation of rod 42. This rod is connected in the usual and well known manner to mercury switches 43 and 44. Switch 44 is provided with contacts 45 and 46 and switch 43 is provided with contacts 47 and 48. These switches are caused to tilt when the temperature in the heating chamber reaches certain predetermined values whereby the mercury in said switches closes a circuit through the contacts. Switch 44 is arranged to close at a lower temperature than switch 43.

Located within the stack 15 is a bimetallic element 50 connected through a rod 51 to a switch 52. The connection between the rod and the switch is of a slip friction type and is designed to cause switch 52 to move to a closed position as soon as the temperature in the stack 16 begins to rise and to cause said switch to open as soon as the temperature begins to fall, irrespective of existing temperatures in the stack. This switch is of the type illustrated in the patent to L. A. M. Phelan, 1,929,606 October 10, 1933. This switch is provided with contacts 53, 54, and 55 which are closed when the stack temperature begins to rise.

For controlling the flow of current to the motor 25 a relay generally designated by the numeral 60 is provided, this relay comprising a relay coil 61, an armature 62, switch arms 64 and 66 and contacts 63 and 65. These switches 64 and 66 are normally in open position and are moved to closed position when the relay coil 61 is energized, armature 62 being connected to the switch arms. A second relay 70 is provided for controlling the speed at which the motor 25 operates. This relay comprises a coil 71, an armature 72 connected to switch arm 73 and contacts 74, 75. When the coil 71 is deenergized switch arm 73 is in engagement with contact 75, as illustrated, and is moved into engagement with contact 74 upon energization of said coil 71.

Located in the space being heated is a thermostat 80 which consists of a bimetallic element 81, a movable contact arm 82 and a fixed contact 83. Upon a drop in temperature in the space the bimetallic element 81 causes arm 82 to move toward the contact 83, contact 83 being engaged by said arm 82 when the temperature reaches a low predetermined value.

For supplying low voltage power to the relays and the solenoid 20, I have provided a step-down transformer generally indicated by the reference character 90. The transformer comprises a high tension primary coil 93 connected by lines 91 and 92 to a suitable source of power (not shown), and a low tension secondary coil 94.

*Operation of Figure 1*

With the parts in the position shown no heat is being called for in the space in which thermostat 80 is located, valve 18 is closed and motor 25 is not running. After the temperature in the space drops to a predetermined value the bimetallic element 81 of the thermostat causes blade 82 to move into engagement with contact 83. Current now flows through the solenoid 20 as follows: from the secondary 94 of the transformer through conductors 100, 101, bimetallic element 81, arm 82, contact 83, conductor 102, coil 20 and conductors 103, 104 to the other side of secondary 94.

The energization of coil 20 causes armature 21 to move upwardly and to move the valve 18 to open position, thereby admitting fuel through pipe 17 to the furnace 10. Heat being generated in the furnace, the temperature in stack 16 immediately begins to rise. This causes the switch 52 to be tilted to closed position by the bimetallic element 50 acting through rod 51. Contacts 53, 54, and 55 are now closed by said switch 52. Relay 60 is now energized through the following circuit: from the secondary 94 of the transformer through conductors 100, 108, 109, contacts 54, 55, conductor 110, coil 61 of the relay, and conductors 111 and 104 to the other side of the secondary 94. Relay coil 61 now being energized, switches 64 and 66 move into engagement with contacts 63 and 65. A circuit is now established through motor 25 as follows: from line 91, conductor 120, low speed contacts 30 and 31, conductor 121, contact 75, switch arm 73, conductor 122, switch arm 66, contact 65 and conductor 123 to the line 92.

Motor 25 now starts operating at low speed causing a circulation of air at a low rate of flow through the heating chamber of the furnace 10, warm air duct 11, register 12, through the space being heated, the register 13 and the return air duct 14 to the fan 15.

After the heating chamber of the furnace reaches a predetermined temperature, switch 44 is tilted to closed position by the bimetallic element 41 acting through rod 42. This tilting of switch 44 closes contacts 45, 46 and establishes a holding circuit through the relay coil 61 as follows: from the secondary of the transformer through conductors 100, 108, and 130, contacts 46, 45, conductor 131, switch arm 64, contact 63, coil 61, and conductors 111, 104 to the other side of secondary 94. It will thus be seen that relay 60 will remain energized as long as the temperature of the heating chamber stays above a predetermined value regardless of stack switch 52.

After the temperature of the heating chamber reaches a higher predetermined value switch 43 is caused to tilt to close contacts 47 and 48. This establishes a circuit through coil 71 of relay 70 as follows: from the secondary 94 of the transformer through conductors 100, 108, 109, contacts 54, 53, conductor 132, contacts 48, 47, conductor 133, coil 71, and conductors 134, 111, and 104 to the other side of secondary 94. Switch 73 is now caused to move into engagement with contact 74 whereby the high speed circuit through the motor 25 is energized as follows: from the line 91, conductor 120, high speed contacts 30, 32, conductor 124, contact 74, switch arm 73, conductor 122, switch arm 66, contact 65 and conductor 123 to line 92. The motor now operates at high speed thereby circulating air at a high rate until the temperature of the space in which thermostat 80 is located rises to a value wherein blade 82 of the thermostat is caused to move away from contact 83. As soon as this happens the circuit through solenoid 20 is interrupted whereby the biasing means (not shown) for valve 18 causes said valve to move to closed position thereby interrupting the supply of heat to the furnace 10. As soon as this happens the temperature in stack 16 begins to fall whereupon switch 52 immediately moves to open position opening the circuit through contacts 53 and 54 as well as through contacts 54 and 55. This causes the circuit through coil 71 of relay 70 to be interrupted whereupon switch blade 73 of said relay moves out of engagement with said contact 74 and back into engagement with contact 75. The low speed circuit through motor 25 is again energized through the circuit previously described.

When the temperature of the heating chamber falls to below the value at which switch 44 was caused to close, this switch opens thereby breaking the circuit through contacts 45 and 46. In this way the previously described holding circuit through relay coil 61 is interrupted and since the other circuit through said coil has been broken due to the opening of contacts 54 and 55 of stack switch 52 the switch arms 64 and 66 are moved to open position. This opening of switch arm 66 breaks the circuit through the motor 25 whereupon it stops rotating and the circulation of air by fan 15 is stopped. The parts have now returned to the position as illustrated and the cycle is repeated when blade 82 of thermostat 80 again moves into engagement with contact 83 due to a sufficient drop in temperature in the space being heated.

It will thus be seen that with the arrangement shown in Figure 1 the following cycle of operation takes place upon a call for heat in the space being heated: fuel is supplied to the furnace and as soon as the stack starts to warm up the circulation of air begins at a low rate; when the temperature of the heating chamber rises high enough the circulation of air begins at a high rate and as soon as the temperature in the space reaches a predetermined value, fuel supply to the furnace is cut off and almost immediately the circulation of air drops to a low rate and when the temperature of the heating chamber drops to a low predetermined value the circulation of air is stopped entirely.

Figure 2:
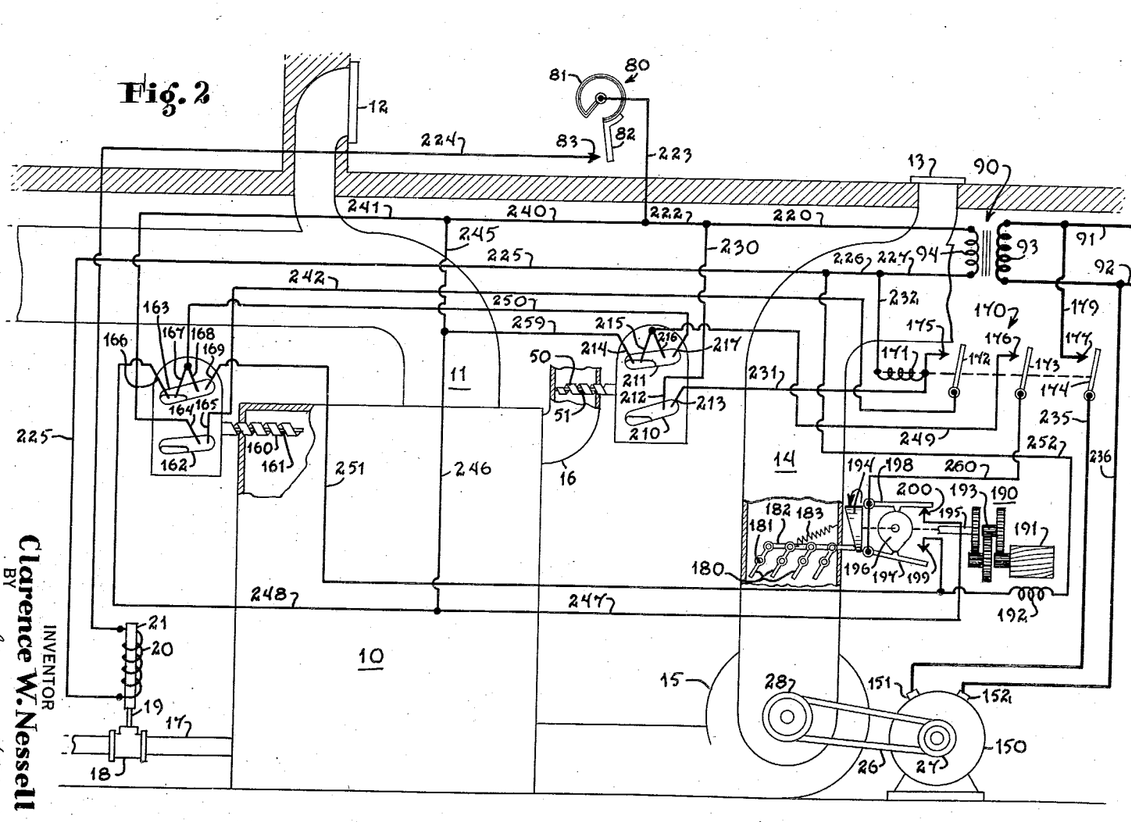
Figure 2 is a view similar to Figure 1 showing a different means for varying the rate of flow of air through the furnace.

DESCRIPTION OF FIGURE 2

The system illustrated in Figure 2 employs the same general cycle of operation as that of Figure 1 but instead of employing a two-speed fan motor, adjustable dampers are provided in the return air pipe.

The heating plant is the same as that of Figure 1 and includes the furnace 10, warm air duct 11, warm air register 12, return air register 13, return air duct 14, fan 15, stack 16 and fuel pipe 17. The means for controlling the flow of fuel through pipe 17 is similar to that of Figure 1 and includes the valve 18, valve stem 19, solenoid 20 and armature 21 as described in connection with Figure 1.

For driving the fan 15 I have provided a single speed motor 150 having terminals 151 and 152 and driving the fan through a belt 26 travelling over the pulleys 27 and 28 of the motor and fan respectively.

In the heating chamber of the furnace is bimetallic member 160 connected through rod 161 to actuate the mercury switches 162 and 163 in the same manner as switches 43 and 44 of Figure 1. Switch 162 is provided with contacts 164 and 165 and switch 163 is provided with two sets of contacts 166, 167, and 168, 169. Contacts 166 and 167 are closed by switch 163 when the temperature in the heating chamber is below a certain predetermined value, and contacts 168, 169 are closed when the temperature in the heating chamber reaches a certain high predetermined value in which position of the switch the contacts 166 and 167 are opened. Switch 162 is arranged to close its contacts 164 and 165 at a temperature lower than that in which contacts 168 and 169 are closed.

Located in stack 16 is bimetallic element 50 connected through rod 51 to the switches 210 and 211 by slip friction connections in the same manner as switch 52 described in connection with Figure 1. The switch 210 is provided with a pair of contacts 212 and 213 and switch 211 is provided with two pairs of contacts 214, 215 and 216, 217. Contacts 214 and 215 are closed when the temperature in the stack 16 is falling and contacts 216, 217 and 212, 213 are closed when the temperature in the stack is rising.

A relay 170 comprising a coil 171, switch arms 172, 173 and 174, and contacts 175, 176, 177 is provided for controlling the current through motor 150 and also through the damper motor 190 to be later described.

Mounted in the return air pipe 14 are dampers 180 pivoted at 181 and connected to operating member 182 said member being moved to the left by means of a cam 194. Spring 183 is connected to operating member 182 to move said member to the right in which position the dampers are partially closed and when said member is moved to the left by cam 194 the dampers are in their fully opened position.

A damper motor generally indicated by reference character 190 and schematically shown includes an armature 191 and a field winding 192. Armature 191 is connected through the reduction gearing 193 to a shaft 195 on which shaft are mounted cams 194 and 196. Cam 194, as previously described, is for the purpose of causing the dampers 180 to be moved to open position when said cam is rotated 180° from the position illustrated. Cam 196 controls the stopping of damper motor 190 when the cam 194 has made a half revolution, this cam 196 cooperating with switch arms 197 and 198 which in turn cooperate respectively with contacts 199 and 200.

*Operation of Figure 2*

With the parts in the position illustrated no heat is being called for in the space in which thermostat 80 is located, valve 18 is closed, dampers 180 are in their partially closed position and no current is being supplied to the motor 150.

When the temperature in the space being heated drops to a predetermined value, arm 82 of thermostat 80 is moved into engagement with contact 83 and closes a circuit through solenoid 20 as follows: from the low tension coil 94 of the transformer to conductors 220, 222, 223, bimetallic element 81, arm 82, contact 83, conductor 224, solenoid 20, conductors 225, 226, and 227 to the other side of coil 94. Valve 18 is now moved to open position whereupon heat is generated in the furnace and the temperature in stack 16 immediately begins to rise.

This rise in temperature in the stack 16 causes switches 210 and 211 to be tilted to a position in which contacts 212 and 213 of switch 210 and contacts 216 and 217 of switch 211 are closed. Closing of switch 210 causes coil 171 of relay 170 to be energized as follows: from coil 94, through conductors 220, 230, contacts 212, 213, conductor 231, coil 171, conductors 232 and 227 to the other side of low tension coil 94. Switches 172, 173 and 174 are now moved into engagement with contacts 175, 176, and 177 respectively. The closing of switch 174 causes current to flow through motor 150 as follows: from line 91, conductor 179, contact 177, switch arm 174, conductor 235, terminals 151 and 152, and conductor 236 to line 92. Air is now commenced circulating through the system at a low rate due to the fact that dampers 180 are in their partially closed position.

When the temperature of the heating chamber reaches a certain predetermined value, switch 162 is tilted to close contacts 164 and 165 and thus establish a holding circuit through relay coil 171 which is independent of the position of stack switch 210, this holding circuit being as follows: from low tension coil 94 through conductors 220, 222, 240, 241, contacts 164, 165, conductor 242, switch arm 172, contact 175, coil 171, and conductors 232, 227 to the other side of low tension coil 94.

After the temperature of the heating chamber rises to a higher predetermined value, switch 163 is caused to tilt to a position in which contacts 168 and 169 are closed. Damper motor 190 is now energized through the following circuit: from the low tension coil 94 through conductors 220, 222, 240, 245, 246, 247, contact 200, switch arm 198, conductor 260, switch arm 173, contact 176, conductor 249, contacts 216, 217, conductor 250, contacts 168, 169, conductor 251, field 192 of the motor, conductors 252, 226 and 227 to the other side of low tension coil 94. As soon as the motor starts rotating, switch blade 197 engages contact 199, due to the rotation of cam 196, and a maintaining circuit which is independent of thermostat 80 is established therefor, so that the motor will not stop before its cycle is completed should the thermostat open. This maintaining circuit is as follows: from transformer coil 94, through conductors 227, 226, 252, field winding 192, switch contact 199, switch blade 197, conductor 260, switch blade 198, switch contact 200, conductors 247, 246, 245, 240, 222, and 220 to transformer coil 94. The motor continues to rotate until cam 196 moves through a half revolution in which position switch arm 198 is moved away from contact 200 thus breaking the aforedescribed circuit through the motor. Cam 194 also moves through a half revolution whereupon the dampers 180 are caused to move to wide open position and the circulation of air is at a maximum rate.

Should the temperature of the heating chamber drop below the high predetermined value at which switch 163 closed contacts 168 and 169 it is desirable to decrease the circulation of the air as this drop in the heating chamber temperature indicates that heat is being taken away faster than it is being supplied thereto. This drop in temperature causes switch 163 to move to the position illustrated in which contacts 166 and 167 are closed. The damper motor 190 is again energized through the following circuit: from the low tension coil 94 through conductors 220, 222, 240, 245, 246, 248, contacts 166 and 167, conductor 250, contacts 217 and 216, conductor 249, contact 176, switch arm 173, conductor 260, switch arm 197, contact 199, field 192 of the motor, conductors 252, 226, and 227 to the low tension coil 94. This causes the damper motor to again rotate until the cam 196 has returned to the position illustrated in which it opens the switch 197 and permits spring 183 to move the dampers 180 to their partially closed position.

Assume however that the heating chamber temperature has not fallen and that this last condition does not exist, that the dampers are in their wide open position and cams 194 and 196 have moved 180° from the position illustrated. After the temperature in the space being heated rises to a value wherein the arm 82 of thermostat 80 moves away from contact 83 the circuit through solenoid 20 is broken, the valve 18 closes thereby cutting off the supply of the fuel to the furnace 10. Immediately the temperature in stack 16 commences to drop whereupon switches 210 and 211 move back to the positions illustrated. Opening of switch 210 does not break the circuit through relay coil 171 because of the holding circuit through said relay and through switch 162 previously described. The moving of switch 211 back to the position where contacts 214 and 215 are closed causes damper motor 190 to again become energized through the following circuit: from low tension coil 94 through conductors 220, 222, 240, 245, 259, contacts 214 and 215, conductor 249, contact 176, switch arm 173, conductor 260, switch arm 197, contact 199, field coil 192 of the motor and conductors 252, 226 and 227 to the low tension coil 94. A maintaining circuit for the motor similar to that previously described is also energized. Rotation of the damper motor 190 continues until cam 196 causes switch arm 197 to move out of engagement with contact 199 in which position the cam 194 has moved back to its original position as illustrated and the spring 183 biases the dampers 180 to their partially closed position.

Air is now circulated at a low rate through the system until switch 162 moves back to the position illustrated in response to a predetermined drop in the temperature of the heating chamber thus breaking the holding circuit through relay coil 171 and causing switches 172, 173 and 174 to open. Current through motor 150 is now interrupted due to the opening of switch 174 and the circulation of air by the fan 15 is now stopped entirely and the parts are all in the position illustrated and the cycle above described is ready to start over again when there is a need for heat in the space being heated.

It is thus apparent that the cycle of operation of the system shown in Figure 2 is similar to that of Figure 1 except that the change in the amount of air being circulated is effected by motor operated dampers in the return air pipe instead of the two-speed motor illustrated in Figure 1.

Figure 3:
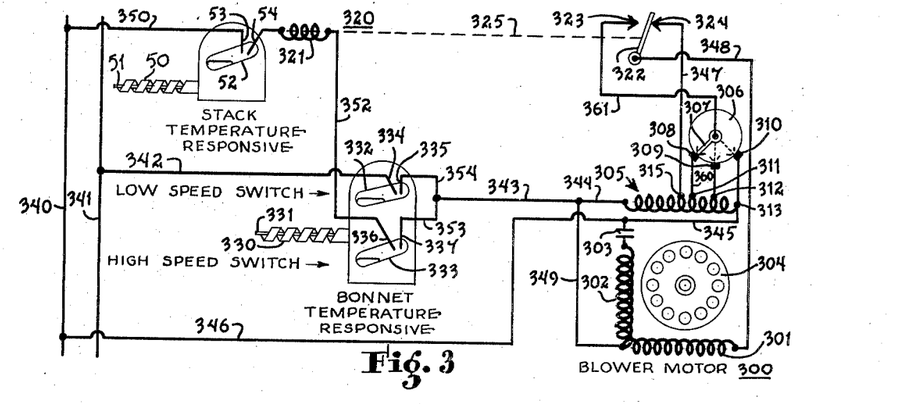
Figure 3 is a wiring diagram of another embodiment of my invention.

DESCRIPTION OF FIGURE 3

In Figure 3 is illustrated another system of controls for a hot air system, the hot air furnace and the various ducts leading thereto being omitted for the sake of simplicity.

A stack switch 52, similar to that shown in Figure 1 and being responsive to the changes in stack temperature irrespective of the particular temperature existing therein, is illustrated. Contacts 53 and 54 are provided to be closed by said switch 52 as soon as the temperature in the stack starts to rise and to be opened as soon as the temperature in the stack starts to fall.

A two speed motor 300 for driving the fan is diagrammatically illustrated, this motor being of the split phase induction type and comprises a field winding 301, a second field winding 302, a condenser 303, an armature 304 and an autotransformer 305. The autotransformer is for the purpose of changing the amount of voltage impressed on the main coil 301 and thereby changing the speed at which said motor operates. The low speed tap of said transformer is indicated by the reference character 315. A controller 306 is provided to vary the high speed voltage impressed on winding 301. This controller includes a switch arm 307 being movable into engagement with contacts 308, 309 or 310; these contacts being connected through suitable conductors to taps 311, 312 and 313 of the autotransformer.

Full line voltage is always impressed across the autotransformer 305 when the motor is running and the voltage impressed upon coil 301 by the autotransformer is controlled by a relay 320. This relay includes a coil 321, switch blade 322, contacts 323 and 324 and an armature 325 connected to the switch blade 322. When the coil 321 is energized switch 322 is moved into engagement with contact 323 and when said coil is deenergized the switch arm 322 is in engagement with contact 324 as illustrated.

A bimetallic element 330 located in the bonnet or heating chamber of the furnace is connected through a rod 331 to operate switches 332 and 333. The switches are so arranged that switch 332 moves into a position to close its contacts 334 and 335 at a lower temperature than is necessary to cause switch 333 to close its contacts 336 and 337. The switch 332 controls the low speed circuit through the motor and switch 333 in conjunction with the stack switch 52 controls the high speed circuits through the motor.

*Operation of Figure 3*

When there is a call for heat in the space being heated, fuel is supplied to the furnace in the same manner as in Figures 1 and 2 and the temperature of the stack immediately begins to rise. This causes switch 52 to move into a position in which contacts 53 and 54 are closed. This has no effect on the operation of the motor 300 however since this switch is in series with the switch 333 and no current can flow therethrough until switch 333 is closed.

When the temperature of the heating chamber reaches a certain predetermined value switch 332 tilts to close contacts 334 and 335. Current now flows through the auto-transformer 305 as follows: from line 341, conductor 342, contacts 334, 335, conductors 354, 343, 344, through the transformer 305, conductors 345 and 346 to the line 340. Current also flows through the coil 302 and condenser 303 as follows: from line 341, conductor 342, contacts 334, 335, conductors 354, 343, 349, coil 302, condenser 303, and conductor 346 to the line 340. The voltage impressed on coil 301 is less than that across the transformer, the circuit from the transformer through said coil being as follows: from the transformer 305, conductors 344, 349, coil 301, conductor 348, switch arm 322, contact 324, conductor 347 to tap 315 on the transformer.

The motor 300 starts rotation at low speed and continues running at this speed and circulating air at a low rate through the furnace and the space being heated until the temperature of the heating chamber reaches a certain high predetermined value at which time switch 333 is tilted to close contacts 336 and 337. Relay coil 321 is now energized through the following circuit: from line 341, conductor 342, contacts 334, 335, conductors 354, 353, contacts 337, 336, conductor 352, coil 321, contacts 54, 53 of switch 52 and conductor 350 to the line 340. Switch 322 is now caused to move into engagement with contact 323 thus establishing a high speed circuit for motor 300. The circuits through the transformer 305 and through coil 302 and condenser 303 are the same as previously described. However, the voltage impressed on coil 301 is now increased due to the position of switch 322. Assuming switch arm 307 to be in the full line position as illustrated the voltage impressed on coil 301 at this time is increased, current flowing through field winding 301 as follows: from transformer 305, conductors 344 and 349, coil 301, conductor 348, switch arm 322, contact 323, conductor 361, controller arm 307, contact 308, conductor 360 to tap 311 on the transformer 305. It will be apparent that if controller arm 307 is in engagement with contact 310 the voltage on the field winding 301 of the motor will be the same as that across the transformer 305 and that the motor will rotate at a higher speed. In this way the high speed of the motor may be varied by the controller 306.

The motor 300 continues to rotate at the high speed determined by the position of controller 306 and circulating air through the system at a predetermined high rate. As soon as the room thermostat is satisfied the fuel supply to the furnace is cut off in the manner illustrated in Figures 1 and 2 and immediately the temperature in the stack starts to fall. This results in moving switch 52 to the position in which contacts 53 and 54 are opened, thus breaking the circuit through relay coil 321. Switch 322 thereby moves away from contact 323 and into engagement with 324 in this way reestablishing the low speed circuit through the motor 300. The motor continues operating at low speed until such time as the temperature in the heating chamber drops to the value at which the switch 332 moves to open contacts 334 and 335 thereby deenergizing the motor 300.

The cycle of operation illustrated in Figure 3 differs from that in Figure 1 in that the low speed operation of the blower motor does not take place in response to a rise in stack temperature but waits until the temperature of the heating chamber of the furnace reaches a certain predetermined value. From this point on the cycle is substantially the same as that in Figure 1.

Figure 4:
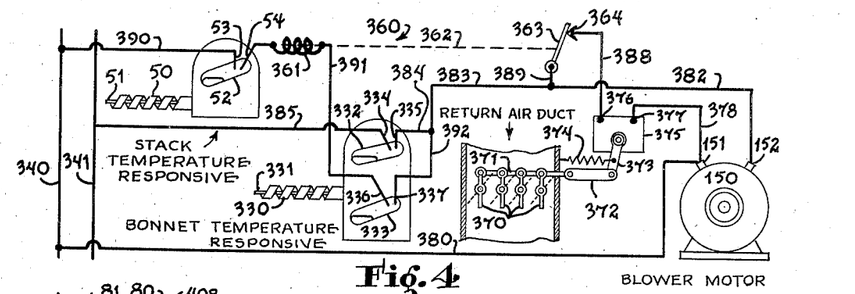
Figure 4 is a wiring diagram of a further modification of my invention.

DESCRIPTION OF FIGURE 4

In Figure 4 is illustrated a wiring diagram to effect the same cycle of operation as in Figure 3 but utilizing instead of a two-speed motor, a single-speed motor and a motor operated damper for varying the amount of air through the return air duct.

Switches 53, 332 and 333 are identical with those shown in Figure 3. The fan motor 150 is similar to that shown in Figure 2.

A relay 360 which includes a coil 361, an armature 362, a switch arm 363 and contact 364 is provided in series with switches 52 and 333. Switch arm 363 is normally in engagement with contact 364 when coil 361 is deenergized. Upon energization of coil 361 the switch arm 363 is moved out of engagement by the armature 362 from contact 364.

Dampers 370 are arranged in the return air duct and are connected to an operating member 371 which in turn is connected through a link 372 with an arm 373 driven by a damper motor 375. The dampers are normally held in their wide open position by means of a spring 374 exerting a pull on arm 373. When damper motor 375 is energized the dampers are moved to their partially closed position.

*Operation of Figure 4*

Upon a call for heat by the room thermostat fuel is supplied to the furnace as in Figures 1 and 2, the temperature of the stack begins to rise and the stack switch 52 is moved to a position to close contacts 53 and 54. When the temperature of the heating chamber reaches a certain predetermined value switch 332 is moved to a position to close contacts 334 and 335. Current now flows through the blower motor 150 from the line 341, conductor 385, contacts 334, 335, conductors 384, 383, 382, motor terminal 152 through the motor to terminal 151 and conductor 380 to the line 340. The damper motor 375 is also energized through the following circuit, it being remembered that switch arm 363 is in engagement with contact 364 since relay coil 361 has not been energized: from the line 341, conductor 385, contacts 334, 335, conductors 384, 383, 389, switch arm 363, contact 364, conductor 388, terminal 376 through the damper motor 375 to terminal 377, conductors 378, 380 to line 340. The dampers 370 are now moved by the damper motor to their partially closed position as indicated in dotted lines. When the temperature of the heating chamber rises to a high predetermined value, switch 333 tilts to close contacts 336 and 337 and establish a circuit through relay coil 361 as follows: from the line 340 through conductor 390, contacts 53 and 54, coil 361, conductor 391, contacts 336 and 337, conductors 392, 334, contacts 335 and 334, and conductor 385 to the line 341. Relay coil 361 causes armature 362 and switch arm 363 to move to the left, in this way breaking the circuit through the damper motor 375, whereby spring 374 causes the dampers 370 to move to their wide open position. A maximum amount of air is now being circulated throughout the system and will continue to be so circulated until such time as the room thermostat is satisfied, provided of course that the temperature in the heating chamber does not drop below its high predetermined value. When the room thermostat is satisfied the fuel supplied to the furnace is cut off as heretofore described, the stack temperature immediately starts to drop, whereupon contacts 53 and 54 are opened by the tilting of switch 52, the circuit through relay coil 361 is thereby interrupted and the switch arm 363 moves back into its normal position in engagement with contact 364. The damper motor 375 is again energized through the circuit previously described and the amount of air circulated is thereby diminished because of the dampers 370 being moved to their partially closed positions.

The circulation of air continues at the low rate until the temperature in the heating chamber drops to a point where switch 332 opens the circuit through contacts 334 and 335 whereupon the circuit through motor 150 is interrupted and the circulation of air is stopped entirely.

Because of the arrangement of damper motor 375 when energized causing the dampers to close and when deenergized causing the dampers to open it will be seen that a safety feature is provided. Should, for one reason or another, there be a failure in the power supply whereupon the blower motor 150 would stop operating it is advisable to have the dampers in wide open position so that a maximum circulation of air through the system will be permitted. This power failure will also cause motor 375 to become deenergized and the dampers will be biased by spring 374 to their wide open position. Were the dampers normally held closed and only opened when the damper motor was energized it will be apparent that upon a failure in the power supply the dampers would be moved to their closed position if they were not already in that position.

Figure 5:
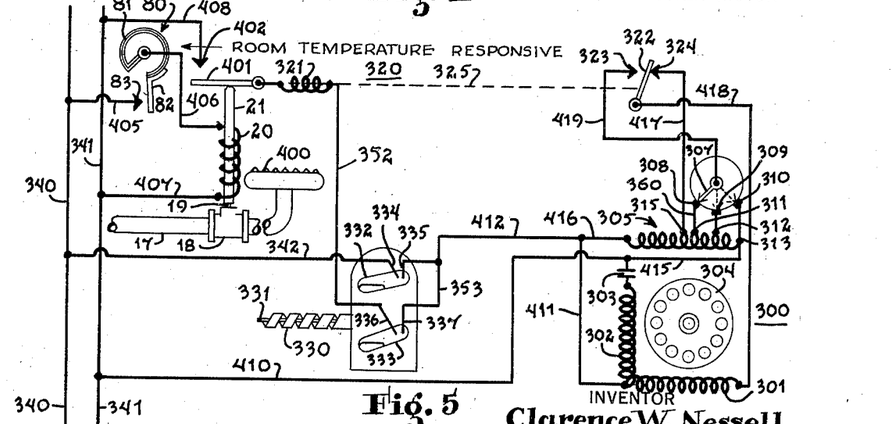
Figure 5 is a wiring diagram of a still further modification of my invention.

DESCRIPTION OF FIGURE 5

In Figure 5 I have illustrated a system which operates in a manner similar to that of Figure 3 except that the stack switch 52 is eliminated and a switch which is operated by the operation of the valve in the fuel supply line is substituted therefor.

A fuel supply line 17 has a valve 18 controlling the flow of fuel therethrough and provided with an upwardly extending valve stem 19 connected to an armature 21 which armature is operated by a solenoid 20. A switch blade 401 rests on top of the armature 21 and is moved into engagement with contact 402 when armature 21 is moved upwardly by the solenoid 20 when said valve is moved to open position. A thermostat 80 similar to that of Figure 1 is provided for controlling the operation of the valve 18. The rest of the apparatus is identical with that of Figure 3 and a further description is not deemed necessary.

Operation of Figure 5

When the room thermostat 80 calls for heat blade 82 thereof moves into engagement with contact 83 and a circuit is established through the solenoid 20 as follows: from line 340, conductor 405, contact 83, arm 82, bimetallic element 81, conductor 406, solenoid 20, and conductor 407 to the line 341. Armature 21 is urged upwardly thus opening valve 18 admitting fuel to the burner 400. This upward movement of armature 21 causes switch blade 401 to move into engagement with contact 402. Since this switch 402 is in series with switch 333 in the same way as switches 52 and 333 of Figure 3 no circuit is established through relay coil 321 at this time. When the temperature in the heating chamber reaches a predetermined value switch 332 is tilted and establishes a low speed circuit through the motor 300 in the same way as in Figure 3. When the switch 333 closes contacts 336 and 337 in response to the attainment of a high predetermined temperature in the heating chamber the relay coil 321 is energized through the following circuit: from line 341, conductor 408, contact 402, switch arm 401 coil 321, conductor 352, contacts 336 and 337, conductor 353, contacts 335 and 334, and conductor 342 to the line 340. The energization of coil 321 causes switch arm 322 to move into engagement with contact 323 and establish a high speed circuit through the motor 300 in the same way as described in Figure 3. As soon as the room thermostat 80 is satisfied arm 82 moves out of engagement with contact 83 and interrupts the circuit through solenoid 20 thus causing valve 18 to close and interrupting the supply of fuel to burner 400. When armature 21 drops due to the energization of solenoid 20 switch arm 401 drops away from contact 402 interrupting the circuit through relay coil 321 whereupon the blade 322 moves back into engagement with contact 324 and the low speed circuit through motor 300 is reestablished. The motor continues to run at low speed until the circuit through the motor is broken by reason of switch 332 moving to open position in response to the temperature of the heating chamber dropping below the value for that switch.

It is thus seen that the system illustrated in this figure operates in substantially the same way as in Figure 3 except that the high speed circuit to the motor is broken directly by the closing of valve 18 instead of by the drop in temperature in the stack which follows as a direct result of the closing of this valve.

Figure 6:
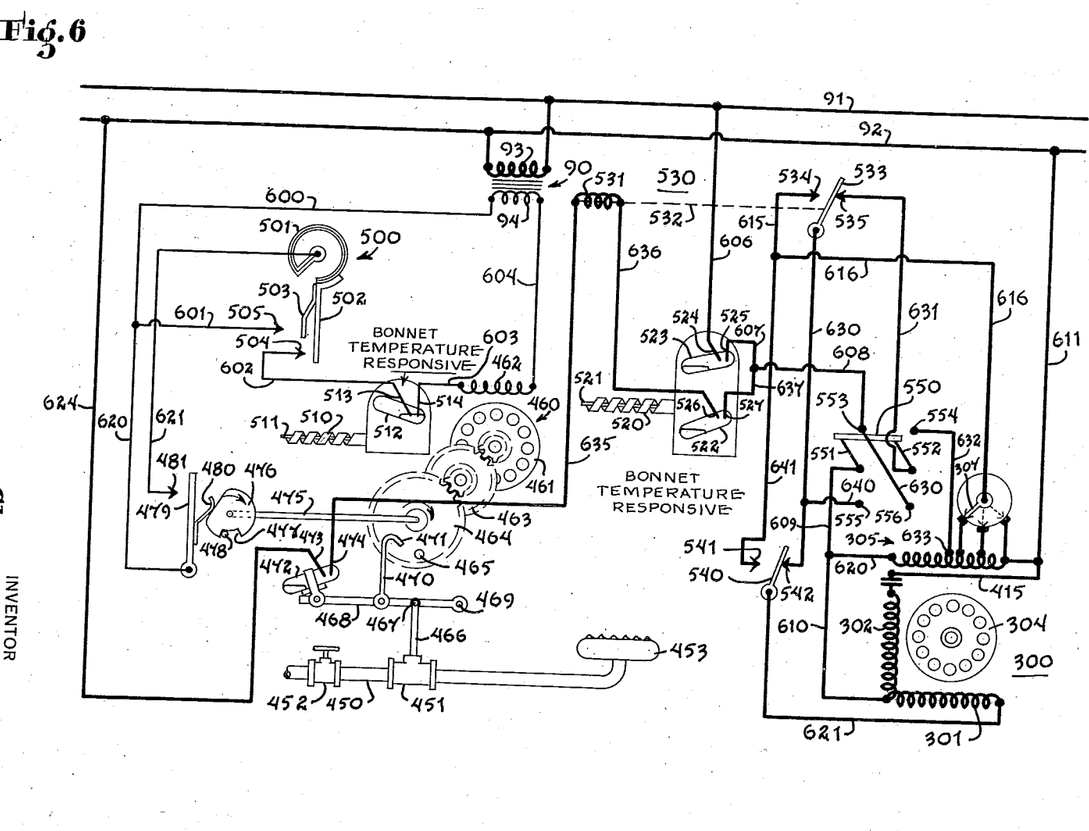
Figure 6 is a view of another modification of my invention.

Description of Figure 6

In Figure 6 is illustrated a circuit similar to that of Figure 5 with the addition of a pair of switches for changing the operation of the system to a cold air circulating system as may be desirable in the summer time. I have also illustrated in this figure a different mechanism for operating the valve controlling the supply of fuel to the furnace.

A motor 300 which is similar to that illustrated in Figures 3 and 5 is provided for operating the circulating fan.

A fuel supply line 450 is controlled by a valve 451 and supplies fuel to the burner 453. This valve is operated by a motor indicated generally by reference character 460 and includes an armature 461 and a field winding 462. Gear 464 is driven by the armature 461 at a low speed through reduction gearing indicated generally by reference character 463. Eccentrically carried by gear 464 is a pin 465. A valve stem 466 extends upwardly from the valve 451 and is pivotally connected at 467 to a lever 468 which in turn is pivoted to a portion of the framework at 469. A member 470 extends upwardly from the lever 468 and has a hooked portion 471 which cooperates with the pin 465. When the gear 464 rotates in the direction of the arrow, pin 465 carried thereby moves into engagement with the hooked portion 471 of the member 470 and exerts an upward pull on member 470 which causes lever 468 to pivot upwardly about pivot 469 thus pulling upwardly on valve stem 466 and causing said valve to open. Motor 460 operates to a stalled position, with the valve open, and stays in this position until deenergized. Any suitable means such as a spring (not shown) may be provided for causing valve 451 to close and to cause member 470 to exert a downward pull on the pin 465 and rotate the motor, when deenergized, in an opposite direction to that which it rotates when energized. The lever 468 carries on the end opposite to the pivot 469 a mercury switch 472. This switch is so arranged on the lever 468 that when the valve is in closed position and the lever 468 is in its corresponding position, as illustrated, the contacts 473 and 474 of said switch 472 are open, and when said lever is moved upwardly to cause the opening of valve 451, the switch 472 is tilted to close the contacts 473 and 474.

Mounted on shaft 475 driven by gear 464 is a cam 476. This cam is provided with a cut-out portion 477 in which is located a pin 478. The cam 476 has a slip friction connection with the shaft 475 and rotates in the same direction as the gear 464 until such time as the opposite end of recess 477 moves into engagement with the pin 478 whereupon further rotation of cam 476 is prevented and slippage between the shaft 475 and the cam occurs. Cooperating with cam 476 is a switch arm 479 having a spring 480 thereon as illustrated. When the cam rotates in the direction of the arrow as far as permitted by the pin 478 the switch arm 479 is caused to move into engagement with the contact 481 for a purpose to be later described.

Located in the heating chamber of the furnace is a bimetallic element 520 which operates through rod 521, the switches 522 and 523. Switch 523 is provided with contacts 524 and 525 and closes these contacts upon the attainment of a high predetermined temperature in the heating chamber. Switch 522 is provided with contacts 526 and 527 and closes these contacts upon the attainment of a higher predetermined temperature in the heating chamber.

A relay 530 comprising a relay coil 531, an armature 532, switch arm 533 and contacts 534 and 535 is provided to regulate the speed at which motor 300 operates.

A double throw single pole switch 540 having contacts 541 and 542 and a double pole double throw switch 550 having switch arms 551 and 552, a pair of contacts 553 and 554, and a second pair of contacts 555 and 556 are provided to convert the system from a hot air circulating system to a cold air circulating system. When the switch 540 is in engagement with contact 542 and switch 550 is in engagement with contacts 553 and 554 the system is set for winter operation and when the switches are in their reversed positions the system is set for summer operation.

It should here be noted that the mercury switches 522 and 523 are of the type that may be manually adjusted whereby the temperatures at which they will close are comparatively low as it is necessary in the summer operation of the system that these switches be closed in order that motor 300 may operate to circulate cold air. The adjustment of these switches may be effected in the manner disclosed by the patent to John P. Kriechbaum, Patent 2,041,645, May 19, 1936.

There is also provided in the fuel supply line 450 a manually operated valve 452 by which the supply of fuel in the summer may be positively cut off when it is desired to use the system for a cold air circulating system.

A room thermostat 500 comprising a bimetallic element 501, a pair of blades 502 and 503, and contacts 504 and 505 adapted to be engaged by the blades respectively, is provided in the space to be heated. The blade 502 is designed to engage the contact 504 before blade 503 engages contact 505. The blade 502 is flexible whereby blade 503 can engage contact 505 when the temperature in the space drops below the value at which blade 502 engages contact 504.

Located in the heating chamber of the furnace is a bimetallic element 510 connected by a rod 511 to a mercury switch 512 in turn provided with contacts 513 and 514. This switch is arranged to open the contacts 513 and 514 if the temperature of the heating chamber reaches a certain high predetermined value.

Operation of Figure 6

With the parts in the position shown the valve 451 is closed and the room thermostat 500 is satisfied. If the temperature in the room falls to a predetermined value, blade 502 of the thermostat is moved into engagement with contact 504. This in itself has no effect on the operation of the system. After the temperature in the room falls a little more, blade 503 of thermostat 500 is moved into engagement with contact 505. A current through motor 460 flows as follows: from the low tension coil 94 of transformer 90 through conductors 600, 601, contact 505, thermostat blades 503, 502, contact 504, conductor 602, contacts 513, 514 of the normally closed switch 512 through the field winding 462 of the motor and through conductor 604 to the other side of the low tension coil 94. Pin 465 is now moved by the motor into engagement with end 471 of arm 470 and upon further movement exerts an upward pull thereon, opening valve 451 and permitting fuel to flow through the supply pipe 450 to burner 453. It will be understood that the manually operated valve 452 is in open position for the winter operation of the system. The upward movement of lever 468 about pivot 469 causes mercury switch 472 to be tilted to a position wherein contacts 473 and 474 are closed.

The rotation of the motor 460 also causes cam 476 to rotate as previously described thereby moving arm 479 into engagement with contact 481 thereby establishing a holding circuit through the motor when the contact 503 moves away from contact 505, the circuit being as follows: from the low tension coil 94 through conductors 600, 620, switch arm 479, contact 481, conductor 621, through the bimetallic element 501 of thermostat 500, arm 502, contact 504, conductor 602, contacts 513 and 514 of switch 512, conductor 603, field winding 462 of motor 460 and conductor 604 back to the low tension coil 94. When the temperature in the heating chamber rises to a certain predetermined value switch 523 is tilted by bi- metallic element 520 to close contacts 524 and 525. The autotransformer 305 is now connected across the line through the following circuit: from line 91 to conductor 606, contacts 524, 525, conductors 607 and 608, contact 553, switch arm 551, conductors 609, 620 through the transformer and through conductor 611 to line 92. Field winding 301 of the motor 300 is connected to the transformer as follows: from the transformer 305 through conductors 620, 610, field winding 301, conductor 621, switch arm 540, contact 542, conductor 630, switch arm 533, conductor 631, switch arm 552, contact 554, conductor 632 to the tap 633 of the transformer. The motor is thus operated at low speed as was described in connection with Figure 3.

When the temperature in the heating chamber reaches a high predetermined value switch 522 is tilted to close contacts 526 and 527, and relay 530 is now energized as follows: from the line 92, conductor 624, contacts 473, 474 which it will be remembered had been closed when the valve 451 was opened, conductor 635, relay coil 531, conductor 636, contacts 526 and 527, conductors 637, 607, contacts 525 and 524, conductor 606 to the line 91. Switch arm 533 is now moved into engagement with contact 534 whereby a high speed circuit through the motor is established, winding 301 thereof being connected to the transformer 305 as follows: from the transformer 305 through conductors 620, 610, winding 301, conductor 621, switch arm 540, contact 542, conductor 630, switch arm 533, contact 534, conductors 615 and 616 through the controller arm 307 to the selected high speed point on the transformer.

Rotation of the motor at high speed continues until the room thermostat is completely satisfied which occurs when both blades 503 and 502 of the thermostat 500 move out of engagement with their respective contacts. When this happens the holding circuit afore-described through the winding 462 of motor 460 is broken, the motor is deenergized and the biasing means for valve 451 causes the valve to move to closed position, moving with it the lever 468 back to its original position. Switch 472 is thus moved to the position in which contacts 473 and 474 are opened, and the circuit through the relay coil 531 is interrupted as will be readily understood.

The deenergization of coil 531 causes switch arm 533 to move back to its original position and the motor 300 resumes its low speed operation. This continues until the temperature of the heating chamber of the furnace has dropped to a point where switch 523 is tilted to open contacts 524 and 525 whereupon the motor stops entirely.

When it is desired to use the system for circulating unheated air as may be desired in the summer time switches 540 and 550 are moved into engagement with contact 541 and contacts 555, 556 respectively. The valve 452 is also operated to cut off the supply of fuel through pipe 450 so that if valve 451 is opened there will be no flow of fuel to the burner 453. It is also necessary to manually adjust switches 522 and 523 so that their respective contacts will be closed when the temperature of the heating chamber is at a low value.

The room thermostat is set so that when the contact blades 502 and 503 are out of engagement with contacts 504 and 505, the temperature of the space in which the thermostat is located is such that it is desired to circulate unheated air through the space. Relay 531 is unenergized since no current can flow through switch 472, the valve motor being unenergized by reason of the open position of the thermostat blades 502 and 503 so that switch 472 does not move to closed position.

Current flows through the motor 300 from line 91, conductor 606, contacts 524, 525, conductors 607, 608, conductor 630, switch arm 552, conductor 631, contact 535, switch arm 533, conductor 630, conductor 640, contact 555, switch arm 551, conductors 609, 620 through the transformer 305 through conductor 611 to the line 92. Current from the transformer 305 flows through coil 301 as follows: from the transformer through conductors 620, 610, field winding 301, conductor 621, switch arm 540, contact 541, conductors 641, 616 through the controller arm 307 to the transformer. It will thus be seen that the motor, during the summer operation at times when it is desired to circulate unheated air through the space, always operates at high speed.

When the temperature of the space in which the room thermostat is located is dropped to a predetermined value and arms 502, 503 of said thermostat engage contacts 504 and 505 respectively, motor 460 is energized through the following circuit: from the low tension coil 94 through conductors 600, 601, contact 505, arms 503, 502, contact 504, conductor 602, contacts 513, 514, conductor 603, field winding 462 and conductor 604 to the other side of coil 94. The motor 460 now causes upward movement of arm 471 by reason of pin 465 exerting an upward pull thereon, thereby moving lever 468 upwardly and causing switch 472 to close the contacts 473 and 474. Valve 451 is opened by this operation, but because valve 452 has been closed for the summer operation no fuel is delivered to the burner 453.

The closing of contacts 473 and 474 causes relay coil 531 to become energized through the following circuit: from line 92, conductor 624, contacts 473 and 474, conductor 635, coil 531, conductor 636, contacts 526 and 527, conductors 637, 607, contacts 525, 524 and conductor 606 to line 91. Switch blade 533 is thus moved into engagement with contact 534 and thus breaking the previously described circuit through the motor. It will thus be seen that with this arrangement when the room thermostat is calling for heat or in other words when the temperature of the space has fallen to a certain predetermined value the operation of the motor stops, whereby the circulation of air through the space ceases.

It will thus be seen that I have provided a convenient two-speed fan system for circulation of hot air in the winter time which system is easily convertible into a system for circulating unheated air when desired as in the summer time. It is obvious that the circuits shown in Figures 1 to 5 could easily be modified to include appropriate switches whereby unheated air could be circulated in the summer time.

While the switches which are responsive to the temperatures of the heating chamber have been shown mounted in the bonnet of the furnace, it is obvious that these switches could as well be placed in the warm air duct 11 thereof and the term "heating chamber" as used in the claims is intended to include this warm air duct.

While I have illustrated and described the preferred embodiment of my invention it is obvious that many changes may be made by those skilled in the art and I wish it to be understood that my invention is limited only by the scope of the appended claims.

I claim as my invention:

1. In an air conditioning system, an air conditioning chamber, means for conditioning air within said chamber, means for circulating air through said chamber and through a space to be conditioned at varying rates of flow, means responsive only to one predetermined condition in said space for causing operation of said air conditioning means and to a second condition for stopping operation of said means, means automatically causing operation of said air circulating means at a low rate of flow only as a result of starting operation of said air conditioning means, means responsive to a predetermined condition in said chamber caused by said air conditioning means for causing circulation of air at a high rate of flow, means responsive to the attainment of the second predetermined condition in said space for lowering the rate of flow of said air circulating means, and means responsive to a predetermined condition in said chamber caused by the stopping of said air conditioning means in response to the attainment of the second condition in the space for stopping the air circulating means.

2. In a temperature controlling system, a temperature changing chamber, means for changing the temperature in said chamber, means for circulating air through said chamber and through a space in which the temperature is to be changed at varying rates of flow, means responsive only to one predetermined temperature in said space for causing operation of said temperature changing means and to a second predetermined temperature for stopping operation of said means, means automatically causing operation of said air circulating means at a low rate of flow only as a result of starting operation of said temperature changing means, means responsive to a predetermined temperature in said chamber caused by said temperature changing means for causing circulation of air at a high rate of flow, means responsive to the attainment of the second predetermined temperature in said space for lowering the rate of flow of said air circulating means, and means responsive to a predetermined temperature in said chamber caused by the stopping of said temperature changing means in response to the attainment of the second predetermined temperature in the space for stopping the air circulating means.

3. In a warm air heating system, a heating chamber, means for heating air within said chamber, means for circulating air through said chamber and through a space to be heated at varying rates of flow, means responsive only to a low predetermined temperature in said space for causing operation of said heating means and to a high predetermined temperature for stopping operation of said means, means for automatically causing operation of said air circulating means at a low rate of flow only as a result of starting operation of said heating means, means responsive to the attainment of a predetermined temperature in said chamber caused by said heating means for causing circulation of air at a high rate of flow, means responsive to the attainment of the high predetermined temperature in said space for lowering the rate of flow of said air circulating means, and means responsive to a predetermined low temperature in said chamber caused by the stopping of said heating means in response to the attainment of the predetermined temperature in the space for stopping the air circulating means.

4. In an air conditioning system, an air conditioning chamber, means for conditioning air within said chamber, a two-speed fan for circulating air through said chamber and through a space to be conditioned, means responsive only to one predetermined condition in said space for causing operation of said air conditioning means and to a second condition for stopping operation of said means, means automatically causing operation of said fan at low speed only as a result of starting operation of said air conditioning means, means responsive to a predetermined condition in said chamber caused by said air conditioning means for causing operation of said fan at high speed, means responsive to the attainment of the second predetermined condition in said space for lowering the speed of said fan, and means responsive to a predetermined condition in said chamber caused by the stopping of said air conditioning means in response to the attainment of the second condition in said space for stopping the operation of said fan.

5. In an air conditioning system, an air conditioning chamber, means for conditioning air within said chamber, means for circulating air through said chamber and through a space to be conditioned, an adjustable damper interposed in the air circulating system, means for moving the damper from partially closed position to open position, said damper being normally in partially closed position, means responsive to one predetermined condition in said space for causing operation of said air conditioning means and to a second condition for stopping operation of said means, means automatically causing operation of said air circulating means as a result of starting operation of said air conditioning means, means responsive to the attainment of a predetermined condition in said chamber caused by the operation of said air conditioning means for causing operation of the damper moving means to move the damper to open position, means responsive to the attainment of the second predetermined condition in said space for causing movement of the damper to partially closed position, and means responsive to a predetermined condition in said chamber caused by the stopping of said air conditioning means for stopping the air circulating means.

6. In a heating system, a hot air furnace including a heating chamber and a flue gas stack, means for heating air within said chamber, means for circulating air through said chamber and through a space to be heated at varying rates of flow, means responsive to a low predetermined temperature in said space for causing operation of said heating means and to a high predetermined temperature for stopping operation of said means, means responsive to either an increase or decrease in stack temperature as a result of the starting or stopping of said heating means for causing operation of said air circulating means at a low rate of flow, means responsive to the attainment of a predetermined temperature in said heating chamber caused by said heating means for causing circulation of air at a high rate of flow, said air circulating means again operating at a low rate of flow upon a drop in stack temperature caused by the stopping of said heating means when the air in the space reaches the high predetermined temperature, and means responsive to a predetermined drop in temperature in the heating chamber caused by the stopping of the heating means for causing a cessation of the operation of the air circulating means.

7. In an air conditioning system, an air conditioning chamber, means for conditioning air within said chamber, means for circulating air through said chamber and through a space to be conditioned, an adjustable damper interposed in the air circulating system, a motor for operating said damper, said motor, when energized, moving the damper to partially closed position, means biasing the damper to more open position upon deenergization of the motor, means responsive to one predetermined condition in said space for causing operation of said air conditioning means and to a second predetermined condition for stopping operation of said means, means automatically causing operation of said air circulating means as a result of starting operation of said air conditioning means, means simultaneously energizing said damper motor to partially close said damper, means responsive to the attainment of a predetermined condition in said chamber caused by the operation of said air conditioning means to deenergize said damper motor, whereby the damper is biased to more open position, means responsive to the attainment of the second predetermined condition in said space for energizing said damper motor whereby said damper is placed in partially closed position, and means responsive to a predetermined condition in said chamber caused by the stopping of said air conditioning means for stopping the air circulating means.

8. In a warm air heating system, a warm air furnace including a heating chamber and an exhaust stack, means for heating air within said chamber, means for circulating air through said chamber and through a space to be heated, an adjustable damper in the circulating means for varying the amount of air circulated through said space, a motor for operating said damper, said motor, when energized, moving the damper to partially closed position, means biasing the damper to more open position upon deenergization of the motor, means responsive to a low predetermined temperature in said space for causing operation of said heating means and to a high predetermined temperature for stopping operation of said means, means responsive to the attainment of a predetermined temperature in said heating chamber for causing operation of the air circulating means and simultaneously energizing said damper motor to partially close said damper and for stopping operation of the air circulating means in response to a predetermined low temperature in said heating chamber, means responsive to the attainment of a higher predetermined temperature in the heating chamber to deenergize said damper motor whereby the damper is biased to more open position, and means responsive to a drop in stack temperature caused by the stopping of the heating means, to again energize the damper motor whereby the damper is again moved to partially closed position.

9. In a temperature changing system, a temperature changing chamber, means conducting a temperature changing medium to said chamber, valve means controlling the flow through said conducting means, means for circulating air through said chamber and through a space whose temperature is to be changed, means responsive to a predetermined temperature in said space for opening said valve means, means responsive to the attainment of one predetermined temperature in said chamber for causing the operation of said air circulating means at a low rate of flow, means responsive to a second predetermined temperature in said chamber for causing the operation of said air circulating means at a high rate of flow, means operated by the closing of said valve means upon the attainment of a predetermined temperature in said space for effecting a reduction in the rate of flow of said air circulating means, and means responsive to the attainment of a predetermined temperature in said chamber caused by the cessation in the flow of the temperature changing medium for stopping the operation of said air circulating means.

10. In a heating system, a warm air furnace including a heating chamber, means for conducting fuel to said furnace for heating said chamber, valve means for controlling the flow of fuel through said conducting means, means for circulating air through said heating chamber and through a space to be heated at varying rates of flow, means responsive to a low predetermined temperature in said space for opening said valve means and to a high predetermined temperature in said space for closing said valve means, means for causing operation of said air circulating means at a low rate of flow in response to the attainment of a predetermined temperature in said chamber, means for causing operation of said air circulating means at a high rate of flow upon the attainment of a second predetermined temperature in said heating chamber, means operated by the closing of said valve means when the space temperature reaches the high predetermined value for causing the air circulating means to operate at a low rate of flow, and means responsive to the attainment of a low predetermined temperature in said chamber caused by the interruption in the flow of fuel to the furnace for stopping the operation of the air circulating means.

11. In a warm air heating system, a heating chamber, means for heating air within said chamber, means for circulating air through said chamber and through a space to be heated at varying rates of flow, means responsive to a low predetermined temperature in said space for immediately causing operation of said heating means and to a high predetermined temperature for stopping operation of said means, means for automatically causing operation of said air circulating means at a low rate of flow as a result of starting operation of said heating means, means responsive to the attainment of a predetermined temperature in said chamber caused by said heating means for causing circulation of air at a high rate of flow, means responsive to the attainment of the high predetermined temperature in said space for lowering the rate of flow of said air circulating means, means responsive to a predetermined low temperature in said chamber caused by the stopping of said heating means for stopping the air circulating means, and means for converting the system into a mere circulating system when the source of heat is shut off from the heating chamber including means for causing operation of the air circulating means when the temperature in said space reaches a high predetermined value, and for stopping the operation of the air circulating means when the temperature of said space reaches a low predetermined value.

12. In a warm air heating system, a heating chamber, means for heating air within said chamber, means for circulating air through said chamber and through a space to be heated at varying rates of flow, means responsive to a low predetermined temperature in said space for causing operation of said heating means and to a high predetermined temperature for stopping operation of said means, means for automatically causing operation of said air circulating means at a low rate of flow as a result of starting operation of said heating means, means responsive to the attainment of a predetermined temperature in said chamber caused by said heating means for causing circulation of air at a high rate of flow, means responsive to the attainment of the high predetermined temperature in said space for immediately lowering the rate of said air circulating means, means responsive to a predetermined low temperature in said chamber caused by the stopping of said heating means for stopping the air circulating means, and means for converting the system into a mere circulating system when the source of heat is shut off from the heating chamber including means for causing operation of the air circulating means at a high rate of flow when the temperature in said space reaches a high predetermined value, and for stopping the operation of the air circulating means when the temperature of said space reaches a low predetermined value.

13. In a heating system, a warm air furnace including a heating chamber, means for conducting fuel to said furnace for heating said chamber, valve means for controlling the flow of fuel through said conducting means, means for circulating air through said heating chamber and through a space to be heated at varying rates of flow, means responsive to a low predetermined temperature in said space for opening said valve means and to a high predetermined temperature in said space for closing said valve means, means for causing operation of said air circulating means at a low rate of flow in response to the attainment of a predetermined temperature in said chamber, means for causing operation of said air circulating means at a high rate of flow upon the attainment of a second predetermined temperature in said heating chamber, means operated by the closing of said valve means when the space temperature reaches the high predetermined value for causing the air circulating means to operate at a low rate of flow, means responsive to the attainment of a low predetermined temperature in said chamber caused by the interruption in the flow of fuel to the furnace for stopping the operation of the air circulating means, and means for converting the system into a mere circulating system when the supply of fuel to the furnace is prevented including means for causing operation of the air circulating means when the temperature in said space reaches a high predetermined value, and for stopping the operation of the air circulating means when the temperature of said space reaches a low predetermined value.

14. In a heating system, a warm air furnace including a heating chamber, means for conducting fuel to said furnace for heating said chamber, valve means for controlling the flow of fuel through said conducting means, means for circulating air through said heating chamber and through a space to be heated at varying rates of flow, means responsive to a low predetermined temperature in said space for opening said valve means and to a high predetermined temperature in said space for closing said valve means, means for causing operation of said air circulating means at a low rate of flow in response to the attainment of a predetermined temperature in said chamber, means for causing operation of said air circulating means at a high rate of flow upon the attainment of a second predetermined temperature in said heating chamber, means operated by the closing of said valve means when the space temperature reaches the high predetermined value for causing the air circulating means to operate at a low rate of flow, means responsive to the attainment of a low predetermined temperature in said chamber caused by the interruption in the flow of fuel to the furnace for stopping the operation of the air circulating means, and means for converting the system into a mere circulating system when the supply of fuel to the furnace is prevented including means for causing operation of the air circulating means at a high rate of flow when the temperature in said space reaches a high predetermined value, and for stopping the operation of the air circulating means when the temperature of said space reaches a low predetermined value.

15. In a heating system, a warm air furnace including a heating chamber and a stack, means for heating said heating chamber, means for circulating air through said chamber and through a space to be heated at varying rates of flow, means responsive to the attainment of a predetermined temperature in said chamber for starting operation of said air circulating means at a low rate of flow and for stopping operation of said means when the temperature in said chamber drops below a predetermined temperature, means responsive to a high predetermined temperature in said chamber for starting operation of said air circulating means at a high rate, and means responsive to a termination of operation of the heating means to immediately change the operation of said air circulating means back to a low rate of flow.

16. In a heating system, a warm air furnace including a heating chamber and an exhaust stack, means for heating said chamber, means for circulating air through said chamber and through a space to be heated at varying rates of flow, a stack switch which changes circuit connections in response to a rise or fall of temperature in the stack, a second switch which changes circuit connections in response to a predetermined temperature in said chamber, a third switch which changes circuit connections in response to a higher predetermined temperature in said chamber, connections between said second switch, said air circulating means and a source of power supply for operating said air circulating means to circulate air at a low rate of flow upon said heating chamber attaining a predetermined temperature, connections including said stack switch and said third switch for operating said air circulating means at a high rate of flow upon said heating chamber reaching a high predetermined temperature, these latter connections being broken upon a reduction in temperature in said stack caused by a shut-down of the heating means, thus causing said stack switch to operate to change the connections, said second named switch operating upon a sufficient decrease in the temperature of the heating chamber to stop the operation of the air circulating means.

17. In a heating system, a warm air furnace including a heating chamber and an exhaust stack, means for heating said chamber, means for circulating air through said chamber and through a space to be heated at varying rates of flow, a stack switch which changes circuit connections in response to a rise or fall of temperature in the stack, a second switch which changes circuit connections in response to a predetermined temperature in said chamber, a third switch which changes circuit connections in response to a higher predetermined temperature in said chamber, a relay including a fourth switch, means connecting said second switch, air circulating means and a source of power for operating said air circulating means at a low rate upon said switch changing connections in response to the attainment of a predetermined temperature in said chamber, means connecting said stack switch, said third switch and a source of power for operating said relay in response to the attainment of a high predetermined temperature in said chamber, said fourth switch being connected in a circuit between the source of power, stack switch, third switch and air circulating means whereby when said relay is energized the air circulating means operates at a high rate of flow, said stack switch changing the circuit connections upon a decrease in stack temperature, whereby said relay is deenergized and said fourth switch moves to its other position and the air circulating means again operates at a low rate of flow, and said second switch moving when the temperature of the heating chamber drops below the predetermined temperature for said switch, whereupon operation of said air circulating means ceases.

18. In a heating system, a warm air furnace including a heating chamber, means for heating said chamber including means for supplying fuel to said furnace, a valve for controlling the supply of fuel to said furnace, a motor for operating said valve, a fan for circulating air through said heating chamber and through a space to be heated, a two speed motor for operating said fan at high and low speeds selectively, means responsive to the attainment of a low predetermined temperature in said space for operating said valve motor to open said valve, and to the attainment of a high predetermined temperature in said space for operating said valve motor to close said valve, a temperature responsive switch means controlled by the temperature in said heating chamber, means responsive to the attainment of a predetermined temperature in said heating chamber and controlled by said temperature responsive switch means for causing low speed operation of said fan motor, a switch operated by said valve motor, circuit means through said last named switch and said temperature responsive switch for operating said fan motor at high speed in response to the attainment of a high predetermined temperature in said heating chamber when said valve is in open position, said circuit being broken by said last named switch when the valve is moved to closed position whereby the motor operates at low speed, circuit means for causing a shut-down of the fan motor in response to the attainment of a low predetermined temperature in said heating chamber, and means for changing the circuit connections for summer operation of the fan whereby the fan motor is driven at high speed in response to the attainment of a predetermined high temperature in said space.

19. In a summer-winter air circulating system, air circulating means, temperature responsive means including two pairs of sequentially engageable contacts movable together in response to a decrease in temperature, a relay under the control of said temperature responsive means, means whereby the relay is energized when both pairs of said contacts are engaged and whereby it remains energized until both pairs of said contacts are out of engagement due to a temperature rise, switching means whereby the air circulating means is operated only when the relay is energized with the switching means in one position and whereby the air circulating means is operated only when the relay is deenergized with the switching means in a second position, air temperature changing means, and means for controlling the same in accordance with whether said sequentially engaging contacts are engaged or not.

20. In a warm air heating system, a heating chamber, means utilizing a fluid fuel for heating air within said chamber, means for circulating air through said chamber and through a space to be conditioned at varying rates of flow, means responsive only to a low temperature condition within said space for causing flow of fuel for increasing the temperature of the air within said chamber and to a high predetermined temperature in the space for interrupting the flow of fuel whereby the temperature in the chamber will immediately start to drop, means for automatically causing operation of said air circulating means at a low rate of flow only as a result of starting operation of said heating means, means responsive to the attainment of a predetermined temperature in said chamber caused by said heating means for causing circulation of air at a high rate of flow, means operative upon interruption of the flow of fuel for lowering the rate of flow by said air circulating means, and means responsive to a drop in temperature in said chamber to a predetermined value caused by the interruption of the flow of fuel in response to the attainment of the predetermined temperature in the space for stopping the air circulating means.

21. In a warm air heating system in combination, a heat source, air circulating means, air supply control means comprising a damper having means normally biasing it into open position, a space thermostat controlling said heat source, control apparatus comprising means responsive to temperature at the heat source, and damper operating means whereby upon a demand for heat and resultant rise in temperature at said heat source said air circulating means is operated and said damper is operated to partially closed position, and further means responsive to the temperature of the heat source for exerting a control effect upon the damper upon a further rise in temperature to move the damper to open position.

22. In a warm air heating system, in combination, means for heating air, means for circulating heated air to a space to be heated, space temperature responsive means controlling the heating means, means responsive to the temperature of the heating means, and air flow control means comprising a damper device of a type normally biased into open position, motor means for the damper device controlled by the means responsive to the temperature of the heating means, said motor means operating said damper device to partially closed position in response to a rise in temperature of said heating means, and said motor means being controlled in response to a further rise in temperature of said heating means in a manner to cause said damper to again move to open position.

23. In a warm air heating system, in combination, means for heating air, means for circulating heated air to a space to be heated, space temperature responsive means controlling the heating means, means responsive to the temperature of the heating means, and air flow control means comprising a damper device of a type normally biased into open position, motor means for the damper device controlled by the means responsive to the temperature of the heating means, said motor means operating said damper device to partially closed position in response to a drop in temperature of said heating means upon termination of a heat demand by said thermostat, and said motor means being controlled in response to a further drop in temperature of said heating means in a manner to cause said damper to again move to open position.

24. In an all year air conditioning control system, in combination, heating means, means comprising a fan for circulating air from said heating means to a space to be heated, a thermostat in said space, a relay controlled by said thermostat, said relay having in and out positions and becoming energized at a predetermined temperature affecting said thermostat, switching means responsive to heat generated at said heating means, means whereby said fan may be operated at variable speeds comprising electrical circuits controlled by said switching means one of said circuits controlling relatively high speed fan operation and another controlling relatively low speed fan operation, said switching means causing said fan to start after said relay has been operated in response to a demand for heat at said thermostat, and to thereafter automatically increase the speed of said fan, summer-winter switching means controlling electrical circuits so arranged that when said last means are in summer position circuits are completed for immediately causing high speed fan operation whenever said relay is in position indicating a demand for less heat at said thermostat, said thermostat controlling operation of the relay in the same manner in summer as in winter, and said first mentioned switching means being operable to control their electrical circuits for operating the fan when said summer-winter switching means are in summer position.

CLARENCE W. NESSELL.

CERTIFICATE OF CORRECTION.

Patent No. 2,238,000. April 8, 1941.

CLARENCE W. NESSELL.

It is hereby certified that error appears in the printed specification of the above numbered patent requiring correction as follows: Page 11, first column, line 44-45, claim 11, strike out the word "immediately" and insert the same after "for" in line 56, same claim; and that the said Letters Patent should be read with this correction therein that the same may conform to the record of the case in the Patent Office.

Signed and sealed this 29th day of July, A. D. 1941.

(Seal)

Henry Van Arsdale,
Acting Commissioner of Patents.